United States Patent [19]

Anthias et al.

[11] Patent Number: 4,890,257

[45] Date of Patent: Dec. 26, 1989

[54] MULTIPLE WINDOW DISPLAY SYSTEM HAVING INDIRECTLY ADDRESSABLE WINDOWS ARRANGED IN AN ORDERED LIST

[75] Inventors: Tefcros Anthias, Romsey; John A. Herrod, Eastleigh; George M. Trees, Hursley, all of England

[73] Assignee: International Business Machines Corporation, Armonk, N.Y.

[21] Appl. No.: 37,281

[22] Filed: Apr. 10, 1987

[30] Foreign Application Priority Data

Jun. 16, 1986 [GB] United Kingdom ................. 8614617

[51] Int. Cl.$^4$ .......................... G06F 3/14; G09G 1/06

[52] U.S. Cl. ................................. 364/900; 364/927.2; 364/927.63; 364/927.631; 364/521; 340/721; 340/750

[58] Field of Search ............... 340/721, 734, 724, 723, 340/747, 799, 750; 364/200 MS File, 900 MS File, 518, 521

[56] References Cited

U.S. PATENT DOCUMENTS

| | | | |
|---|---|---|---|
| 4,414,628 | 11/1983 | Ahuja et al. | 340/721 X |
| 4,542,376 | 9/1985 | Bass et al. | 340/721 X |
| 4,555,775 | 11/1985 | Pike | 364/900 |
| 4,642,790 | 2/1987 | Minshull et al. | 365/900 |
| 4,651,146 | 3/1987 | Lucash et al. | 340/721 |
| 4,688,033 | 8/1987 | Carini et al. | 340/799 X |
| 4,694,288 | 9/1987 | Harada | 340/721 |
| 4,769,762 | 9/1988 | Tsujido | 340/721 X |
| 4,780,710 | 10/1988 | Tatsumi | 340/721 |

FOREIGN PATENT DOCUMENTS 0147542 3/1985 European Pat. Off. .

*Primary Examiner*—Emanuel S. Kemeny
*Assistant Examiner*—Michael A. Jaffe
*Attorney, Agent, or Firm*—Jack M. Arnold; Marc D. Schechter

[57] ABSTRACT

A multiple window display system includes a display device and a screen ownership area pointing to the identity of the window which is to contribute the data for each display area of the display device. An ordered list is maintained of the active windows in the priority order thereof. Means are provided to regenerate the screen ownership area from the ordered list, on each change made to the list, in terms of list position per device display area, by overwriting, progressing through the list in order of increasingly significantly priority order, the list indicating, in each position thereof, the identity of the window having the respective priority. The list contains the addresses of the windows in storage and the type thereof. The screen ownership area is reset to the lowest potential priority list position value and is overwritten.

13 Claims, 9 Drawing Sheets

MULTIPLE WINDOW DISPLAY SYSTEM HAVING INDIRECTLY ADDRESSABLE WINDOWS ARRANGED IN AN ORDERED LIST

DESCRIPTION

1. Technical Field

The present invention is generally related to a multiple window display system for displaying multiple data windows on cathode ray tube (CRT), gas panel, liquid crystal displays (LCD) and other like displays commonly used in computer and data processing systems. The invention has its primary application in multi-tasking computer environments wherein each window displays data from a different one of the tasks.

2. Background Art

Generation of video data for a raster scanned CRT is well understood. A CRT controller is used to generate memory addresses for a display refresh buffer. A selector, interposed between the controller and the buffer, is used to provide an alternate source of addressing so that the contents of the refresh buffer can be modified. Thus, the selector may pass the refresh address from the controller or an address on the system address bus to the display refresh buffer. By time division multiplexing (TDM) the refresh buffer bandwidth, interference between refresh and system accesses can be eliminated.

For an alphanumeric character display, the display refresh buffer usually contains storage for a character code point and associated attributes. The character code point is used to address the character pel generator. Outputs from the character generator are produced in synchronism with the scan line count output from the CRT controller. Attribute functions such as reverse video, blink, underscore, and the like are applied to the character generator outputs by the attribute logic, and the resultant pels are serialized to the video monitor.

A number of operating system (OS) programs and application programs allow a computer to carry on multiple tasks simultaneously. For example, a background data processing task might be carried on with a foreground word processing task. Related to the background data processing task might be a graphics generation task for producing pie or bar charts from the data generated in the data processing task. The data in all these tasks might be merged to produce a single document.

The multi-tasking operation may be performed by a single computer such as one of the more popular micro computers now on the market, or it may be performed by a micro computer connected to a host computer. In the latter case, the host computer generally carries out the background data processing functions, while the micro computer carries out the foreground operations.

By creating a composite display refresh buffer, the system can also be used to display windows from multiple tasks. Each task is independent of the others and occupies non-overlapping space in the system memory. User-definable windows for the tasks resident in system memory can be constructed so as to display, within the limits imposed by the screen size, data from each of the tasks being processed.

From the user perspective, windows can be displayed as either non-overlapping or layered or overlapping. An overlapping display does not imply lost data in the system memory. It is necessary to preserve the data for each task so that as an occulting window is moved about the display screen or even removed from the display screen, the underlying display data can be viewed by updating the refresh buffer.

While the basic implementation, just outlined, is adequate for a class of use, it can become performance limited as the number of display windows and tasks is increased or as the display screen size is increased. As the time required to update the display refresh buffer significantly increases, system response time increases and therefore throughput decreases. Slower system response times can result from the following factors:

1. The display refresh buffer must be updated each time a task updates a location within system memory being windowed to the display screen. Control software, usually the OS, must monitor and detect the occurrence of this condition;

2. Scrolling data within one or more of the display windows requires the corresponding locations in the display refresh buffer to be updated. This may be better appreciated with reference to European Patent Application No. 0,147,542. FIG. 3 shows the case of non-overlapping windows as in FIG. 2A. Scrolling is accomplished by moving the viewable window within the system memory. A corresponding technique is used when scrolling data in overlapping windows as in FIG. 2B; and 3. Whenever window sizes or positions are changed, the display refresh buffer must be updated with the appropriate locations for the system memory.

In European Patent Application No. 0 147 542, one way of overcoming these difficulties was proposed, by providing a multiple window display system including a repeatedly scanned display device, a screen buffer having display data element locations mapped directly onto the display areas of the display device and accessing means traversing the display data element locations in synchronism with the traverse of the display areas of the display device and a facility for compiling, from, potentially, a plurality of windows generated independently by individual respective users, an aggregate of data elements to be displayed. The compiling facility is controlled by a picture matrix having compile control locations mapped directly onto the display areas of the display device and is directly responsive to the contents of the control locations to automatically filter the available data elements from the various windows, display area by display area.

The term "user" is adopted to span task, processor or operator since to the display there is no apparent difference between these.

Both hardware and software arrangements are described. With respect to hardware implementation, plural screen buffers are simultaneously read out in a cyclic manner, and task selection means couples the output of a single one of the buffers to video output at any given time. For any given point on the screen, the data displayed originates from a selected buffer appropriate to the overall composition producing a screen picture compiled from more than one of the screen buffers.

The task selection means may be a separate task selection buffer and decoder, in which case the task selection buffer is synchronously addressed with the screen buffers and the decoder enables the read out of a single one of the screen buffers for any point on the display screen. Alternatively, one of the screen buffers may be designated to perform the operation of the task selection buffer.

The display data in the designated screen buffer is non-transparent in the sense that it cannot, at a location corresponding to a given screen location, also be used for display data for that screen location, since that buffer location is loaded with unique selection code used to indicate one of the other buffers from which the data for that location is to be taken. The absence of one of these selection codes at the accessed non-transparent buffer location allows the data at that location to be displayed, as a default condition, at the corresponding screen location. In this way, it will be apparent how the display is compiled from data, in part, from the non-transparent buffer and, in part, from the other screen buffers.

Software implementation makes extensive use of system memory. The system memory provides presentation spaces for receiving application data for plural windows of the displayable area. Each window defines the whole or a subset of a corresponding presentation space. A window priority matrix mapped to the display screen filters the data from the windows of the presentation spaces to the screen buffer to designate which of the data will be shown in corresponding positions of the display screen. In a hybrid version, display data filtering can be performed both on loading a screen buffer and also on selective read out of the screen buffers where more than one such is provided.

Currently, the task structures that are possible, with one task generating subordinate tasks and these, in turn generating their own subordinate tasks, as well as the possibility being provided of separating the functions of providing window frames and window backgrounds from that of providing the actual data to be displayed, as well as handling different kinds of data within a window as if they were in different windows, the provision of a sufficiency of hardware screen buffers becomes a practical problem and the maintaining and using of the window priority matrix becomes a very significant processing overhead if the above described procedures are followed.

DISCLOSURE OF THE INVENTION

It is the object of the present invention to provide a multiple window display system, so arranged that the maintaining and using of the window priority definition is considerably simplified.

Accordingly, the present invention provides a multiple window display system including a display device and a screen ownership area pointing to the identity of the window which is to contribute the data for each display area of the display device, characterized in that an ordered list is maintained of the active windows in the priority order thereof, means being provided to regenerate the screen ownership area from the list, on each change made to the list, in terms of list position per device display area, by overwriting, progressing through the list in order of increasingly significant priority, the list indicating, in each position thereof, the identity of the window having the respective priority.

Thus the window priority definition is maintained by a combination of the updating the list and regenerating the screen ownership area therefrom.

As described hereinafter, the priority of a window is a function of recency of use and its position in the hierarchy of extant tasks. When a particular task window becomes active because some change in it, or some communication with it or, merely, a sight of it is required, that window takes the highest priority and thus can be said to go to the head of the list. If the task, associated with the window, is a subordinate task and thus is a member of a branch of the hierarchy of tasks, all the tasks associated with its branch gain in priority, moving to the head of the list, preserving their same relative priority order, except that the particular task goes to the head of the shifted group of tasks. An inactive window does not appear in the list.

The ordered list contains the addresses in storage of the control blocks of the stored data corresponding to the windows to be displayed and indications of the nature of that data: window frame, window background or data type (graphics, text, . . . ). The screen ownership area comprises a stored byte per display data area so that, assuming an eight bit byte, there can be up to 255 active windows, since all that has to be stored in the screen ownership area is an indication of the corresponding list position. The list position is also stored in the control block of the data form of the window in storage.

The updating of the screen ownership area is relatively direct since the information required is at hand. For example, at the current level of the list being processed is the address to go to in order to obtain the dimensions of the window and the nature of the window is overtly contained in the list and that which it defines will replace all that is contained in the screen ownership area that corresponds. Updating of the screen ownership area can be by a single operation if the window is screen sized, but can be expected to be by row in normal circumstances.

BEST MODE OF CARRYING OUT THE INVENTION

The arrangements described, whether prior art or according to the present invention, are for use with a CRT display. However, CRT displays are but one of many types of display, including gas panels and liquid crystal displays, to which the present invention may be applied. Therefore, those skilled in the art will understand that the mention of CRT displays is by way of example only. It follows therefore that the term refresh buffer, while having a particular meaning as applied to CRT displays, is fully equivalent to either a hardware or software screen buffer for storing data to be displayed.

Figure 1:
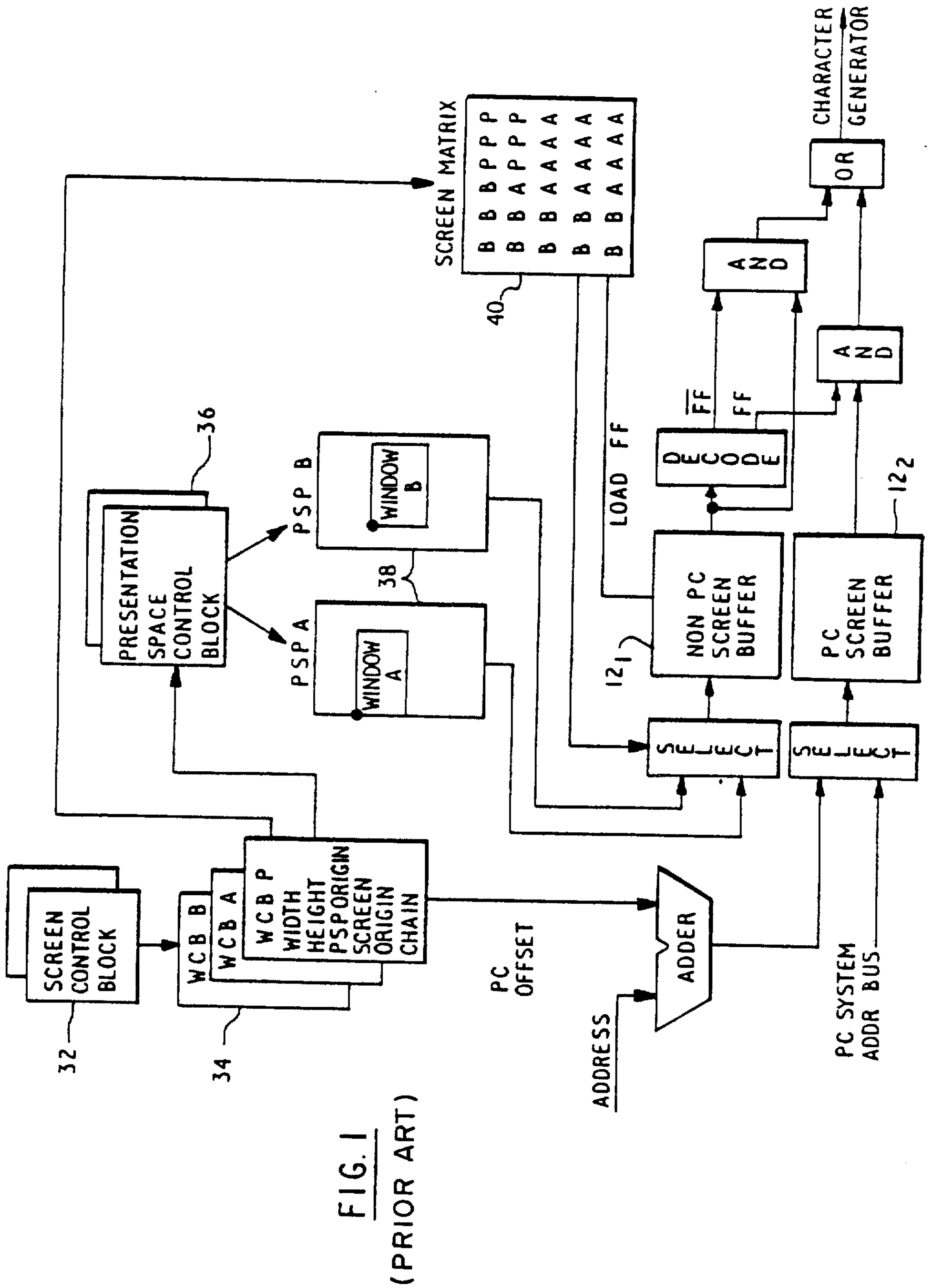
FIG. 1 (PRIOR ART)
FIG. 1 is a block diagram of one prior art embodiment of a raster scanned CRT display generator taken from European Patent Application No. 0 147 542.
Figure 2:
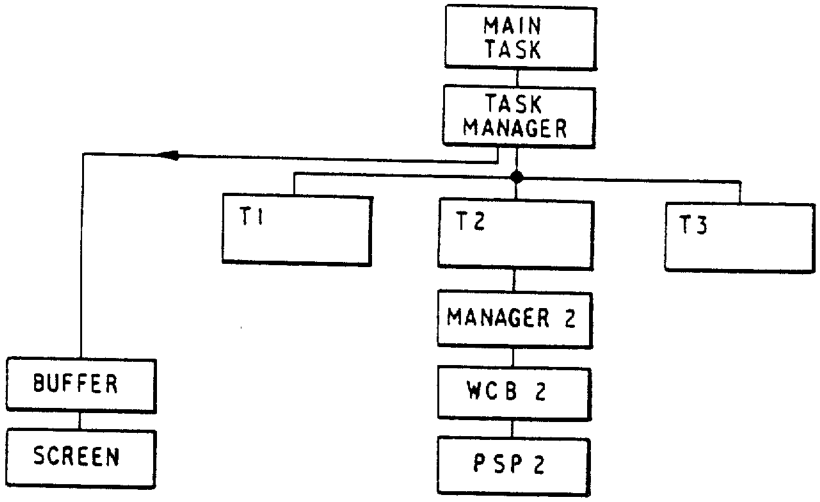
FIG. 2 is a block diagram of a simple task structured configuration of a multiple window display system according to the present invention.

The present invention relates to the maintaining of a current screen save area, directly equivalent to the screen matrix of the prior art referred to and illustrated in FIGS. 1 and 2 hereof. A full description of the prior art can be found in EP-A-No. 0 147 542. The present invention is independent of the number of screen buffers incorporated. For convenience, a extract of the referenced prior art is repeated as it relates to FIG. 1 hereof (FIG. 7 of the prior art).

In the prior art implementation illustrated in FIG. 1 hereof, only two discrete hardware buffers $12_1$ and $12_2$ are used, though extensive use of defined areas of homogeneous system memory is made and the filtering function, still determined by a screen matrix (referenced 40 and maintained in memory) is split between selection of what is loaded into one of the buffers, relatively speaking a "one-time-function" and which of the two buffers is to provide the current output to the screen, as in the previous embodiments (described in European Patent Application No. 0 147 542). The effect is the same. Though more work is done in manipulating memory, this is offset by the reduction in the frequency at which it is performed.

In the specific case illustrated, a micro computer connected to a host computer is assumed with buffer $12_2$ being the micro computer buffer, but it will be understood by those skilled in the art that the pre-bffer filtering under the control of the screen matrix can be applied also to a single computer with a single buffer, provided there is sufficient system memory available.

As shown, this implementation employs screen control blocks 32, window control blocks 34, presentation space control blocks 36, presentation spaces 38, and a screen matrix 40. There may be, for example, ten screen control blocks and ten sets of window control blocks, one each for each screen layout. A given screen control block 32 points to a corresponding set of window control blocks 34. Each presentation space 38 has at least one window per screen layout. The presentation spaces, but not the windows, are common to all screens.

The window control block 34, corresponding to a given presentation space 38 in that screen layout, defines the origin (upper left hand corner) of the window in the presentation space, the width and height of that window in the presentation space and the origin of the window on the display screen. The screen matrix 40 is a map of the data to be displayed and, in one embodiment, maps, on a one-to-one basis by character, that which is to be displayed on the CRT screen, but the mapping could be on a pel or any other basis. All display output from the several tasks is directed to memory and, specifically, to the presentation spaces 38 rather than to the hardware refresh buffer.

In the arrangement illustrated in FIG. 1, a micro computer, such as the IBM (R.T.M.) Personal Computer (PC), is assumed to be attached to a host computer such as an IBM 3270 computer via a controller such as an IBM 3274 controller. For this case, the PC hardware buffer $12_2$ acts as the PC presentation space. Each presentation space is assigned an identification tag and has an associated window defined by the operator or an application program as to size and screen location.

When the human operator or application program adjusts the windows relative to one another, the system builds an image in the screen matrix 40 consisting of the identifying tag aligned in the appropriate locations. The matrix 40 may be created in a reverse order from that appearing on the CRT screen allowing overlapping windows to be built up by overwriting. Alternatively, by using a compare function, the matrix 40 can be created by beginning with the uppermost window and so on, down through the overlay.

The choice of the method of creating the matrix 40 is based on desired system performance. The system directs display output to the refresh buffer by filtering all screen updates through the screen matrix 40, allowing a performance increment in an overlapped window system by only allowing those characters that actually need to be changed or displayed on the screen to reach the refresh buffer. Those characters that are not currently required, do not reach the refresh buffer, will not cause an unnecessary redraw. The absence of these unnecessary redraws removes the requirement for continual updates of all windows whenever the contents of one is altered.

In order to write a character, the IBM 3274 controller, a supervisor aplication or the PC writes character code into presentation space 38 at locations designated by that presentation space's cursor value control block. No other updates are required. The new character will be displayed or not according to whether it falls within the window designated by the corresponding window control block 34 and the portion of that window designated for display by the screen matrix 40.

To use the PC buffer $12_2$, a window control block is established for the PC the same as any other window control block 34 including width, height, presentation space origin, and screen origin. The screen matrix 40 is updated, and data from the window in the PC buffer defined by the window control block 34 will, to the extent allowed by the screen matrix 40, appear on the CRT screen.

Data within a window may be scrolled by decrementing or incrementing the X or Y value of the window origin. No other control updates are needed. Only the corresponding window in the screen buffer is rewritten or, if a PC window, the offset register is changed. A window can be relocated on the screen by changing the origin coordinates in the window control block 34 for that window. The screen matrix 40 is updated, and the entire non-PC screen buffer is rewritten with data for non-PC tasks and codes (hexadecimal FF) for the PC.

To enlarge the visible portion of a presentation space without scrolling, the window control block 34 for that presentation space 38 is first updated by altering the width and/or height. This adds to the right or bottom of window only unless there is also a change in the origin of the window. Ordinarily, there is no change in the origin unless there is an overflow off the presentation space or screen, in which case, the corresponding origin is altered. Next, the screen matrix 40 is updated by overwriting window designator codes of the matrix, starting with the lowest priority window control block. Then, all windows to non-PC refresh buffer $12_1$ are rewritten with data from the presentation space for the non-PC windows and the hexadecimal code FF for the PC window.

In such a context, the effort required to maintain the screen matrix, or as it is better termed and so termed hereinafter, the screen ownership area, as it can be located in general storage, is a direct function of the complexity of the task structure.

Figure 3:
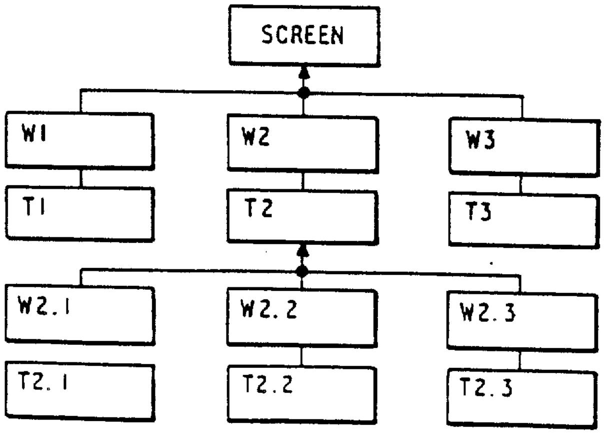
FIG. 3 is a block diagram of a minimal window hierarchy possible in the system of FIG. 2.

Consider the system structure illustrated in FIG. 2 hereof. The system, considered logically, comprises one real device, the screen, per se. As far as the screen operation is concerned, there is one real task, that of displaying that which is required on the screen, and, for this purpose, there is a main task manager, which, in the context of FIG. 1, handles the screen control block 32. The potentially many subordinate tasks, each have their own task managers which operate as if each owned the entire screen, maintaining their individual window control block and presentation space control blocks. In effect, they each operate a virtual device, or would, if it were not possible for a subordinate task to generate further tasks subordinate to itself. This creates a hierarchy of tasks, as can be seen in FIG. 3.

The real device, with its task manager is the apex of the hierarchy and the first level branches indicated by window 1, window 2 and window 3, provide what is shown on the real device, i.e., the screen. Similarly. window 2 is subdivided to support its own subordinate tasks, indicated by window 2.1, window 2.2 and window 2.3. Window 2 only shows what is provided by windows 2.1, 2.2 and 2.3, or would do so, if it had sole access to the real task manager. However, it has to contend with with windows 1 and 3. It will be noticed that only the terminal virtual devices, and not the subordinate tasks, contend for ownership of the real device so that, as illustrated, window 2, per se, is not a candidate for display, only windows 1, 2.1, 2.2, 2.3 and 3.

A window becomes active, in the sense that it is used herein, not because it exists, but because it is called by the user, human or process, external to the display system, as such. The most recently called window is the currently most important window and has top priority as far as ownership of the screen is concerned. This means that, if window 2.3 is called and becomes active, window 2, although not of itself displayed, becomes more important than windows 1 and 3, but window 2 is comprised of windows 2.1 and 2.2, as well as window 2.3, the one called, so that these two sibling windows are also promoted, though not to the extent that window 2.3 is promoted.

Windows remain active, once called, until they are specifically discarded. This means that, in the situation outlined above, if window 2.3 were discarded, windows 2.1 and 2.2, would remain promoted. From this, it will be apparent that reconstructing the screen ownership area and the processing of the window hierarchy, each time a window is called, can very quickly become impractical, particularly as it is envisaged that large numbers of terminal virtual devices can be accommodated.

Figure 4:
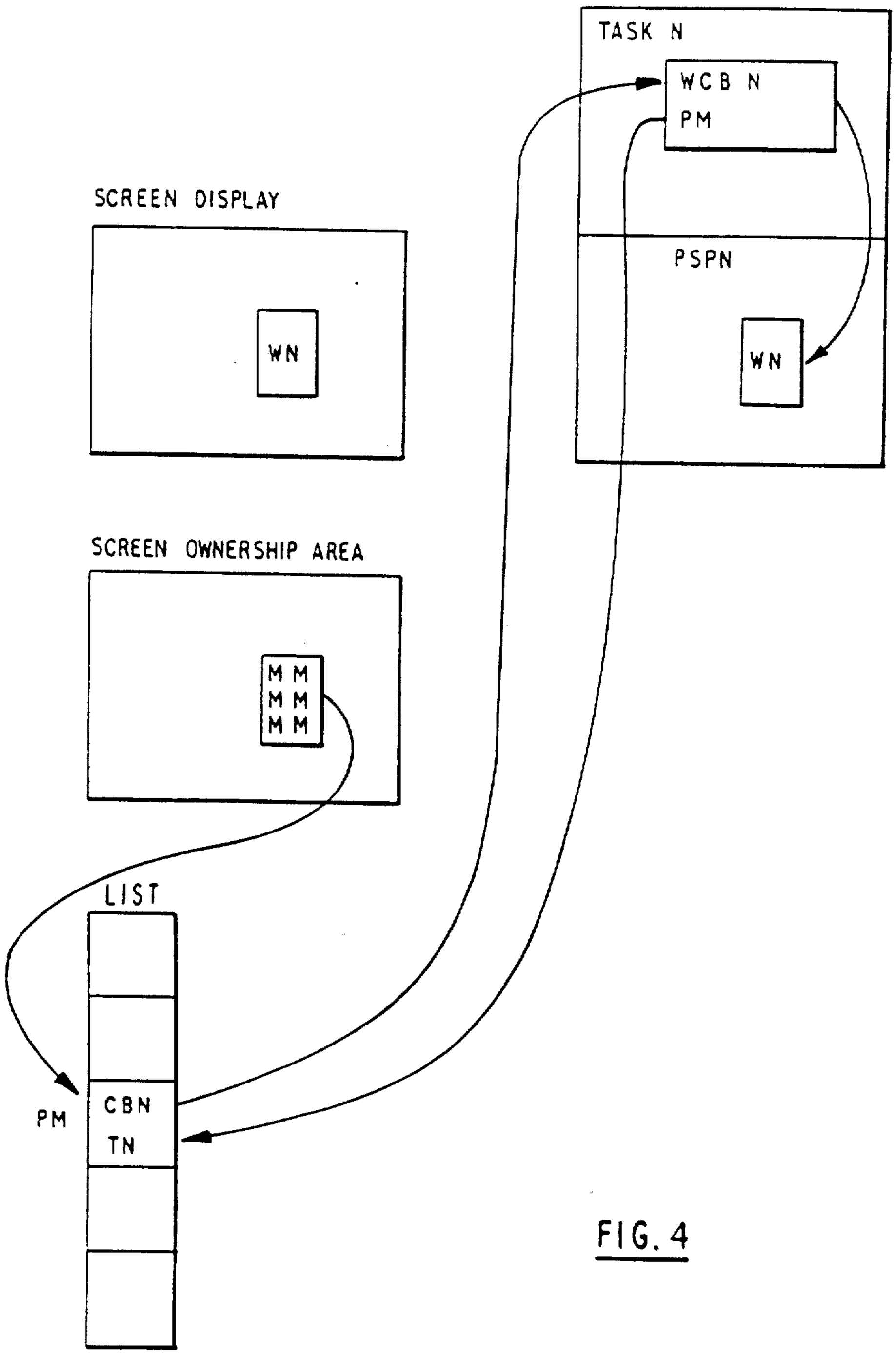
FIG. 4 a block diagram illustrating the relationship of a task N with its current list position M, the screen ownership area and the screen display, in isolation.
Figure 5A:
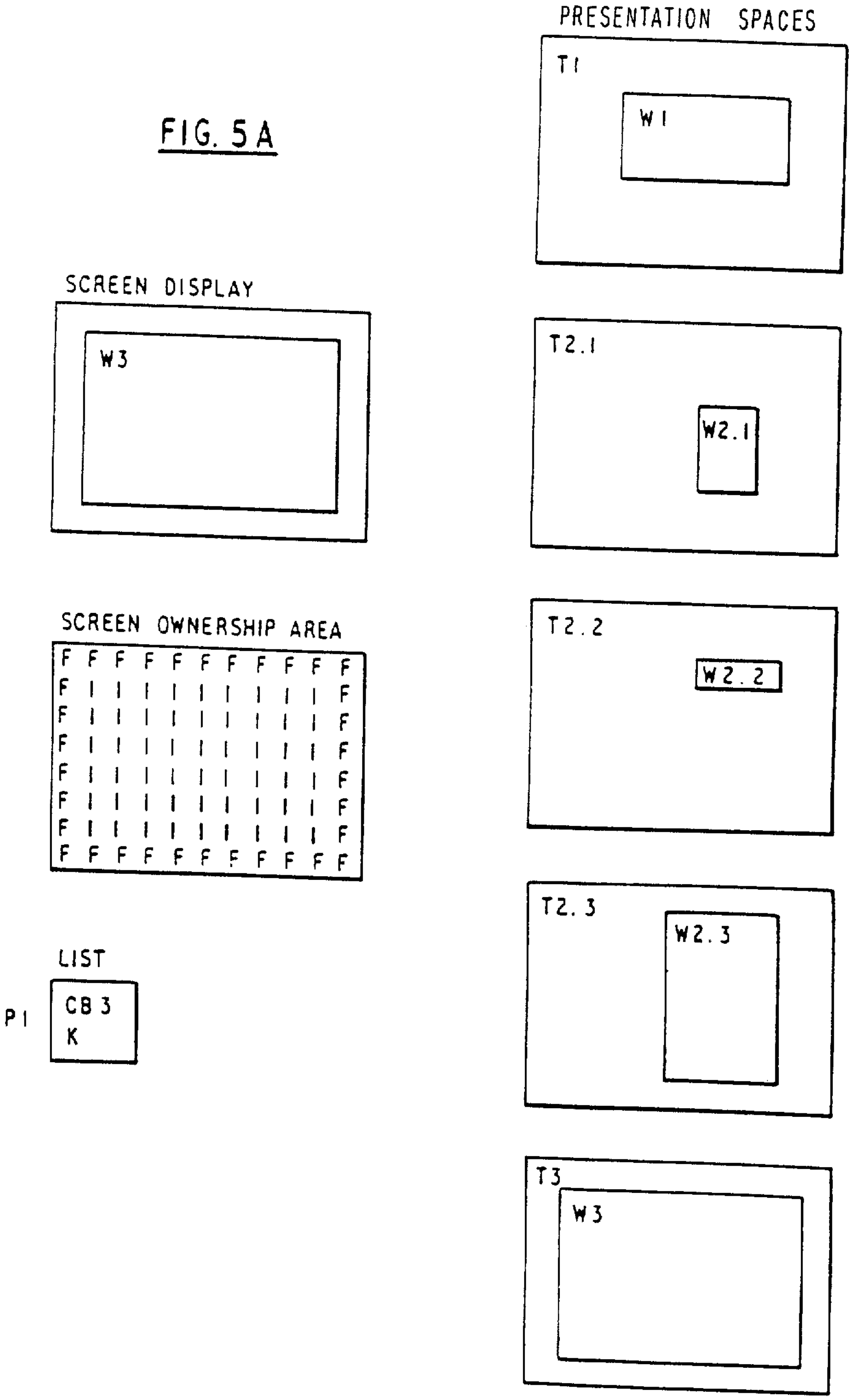
FIGS. 5A-5E sequentially show the buildup of the list, screen ownership area and the display as five successive tasks become active and so remain.
Figure 5B:
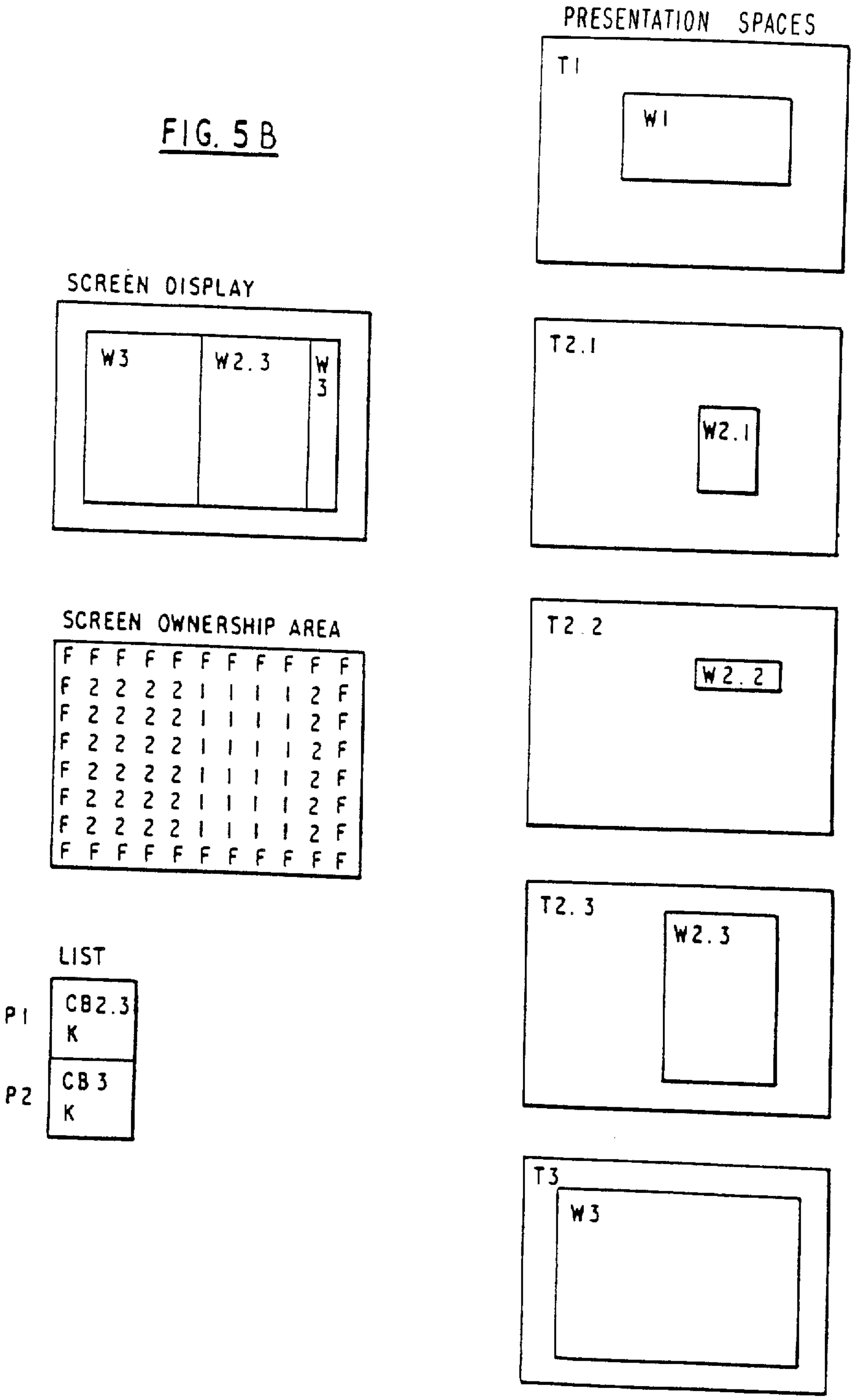
Figure 5C:
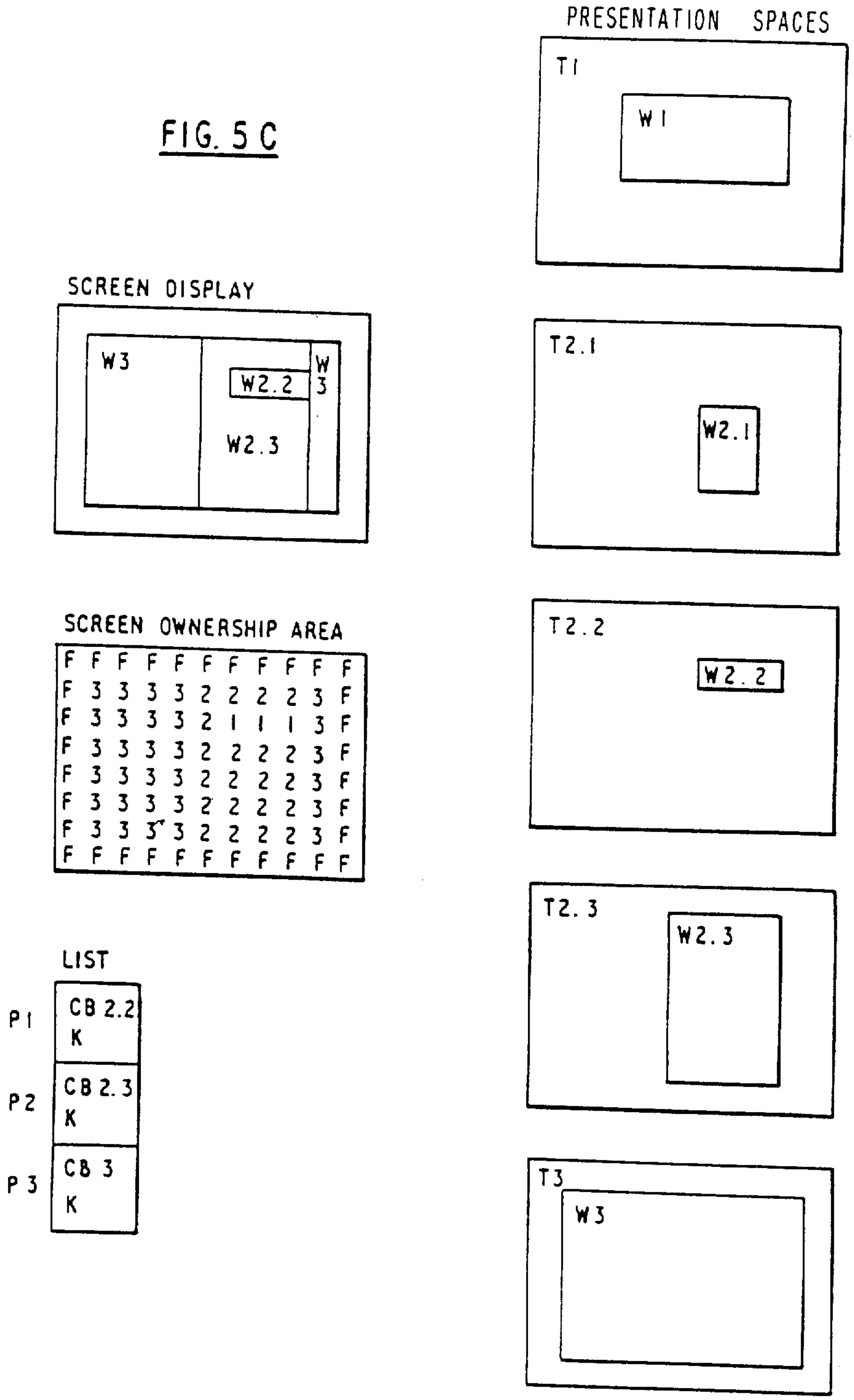
Figure 5D:
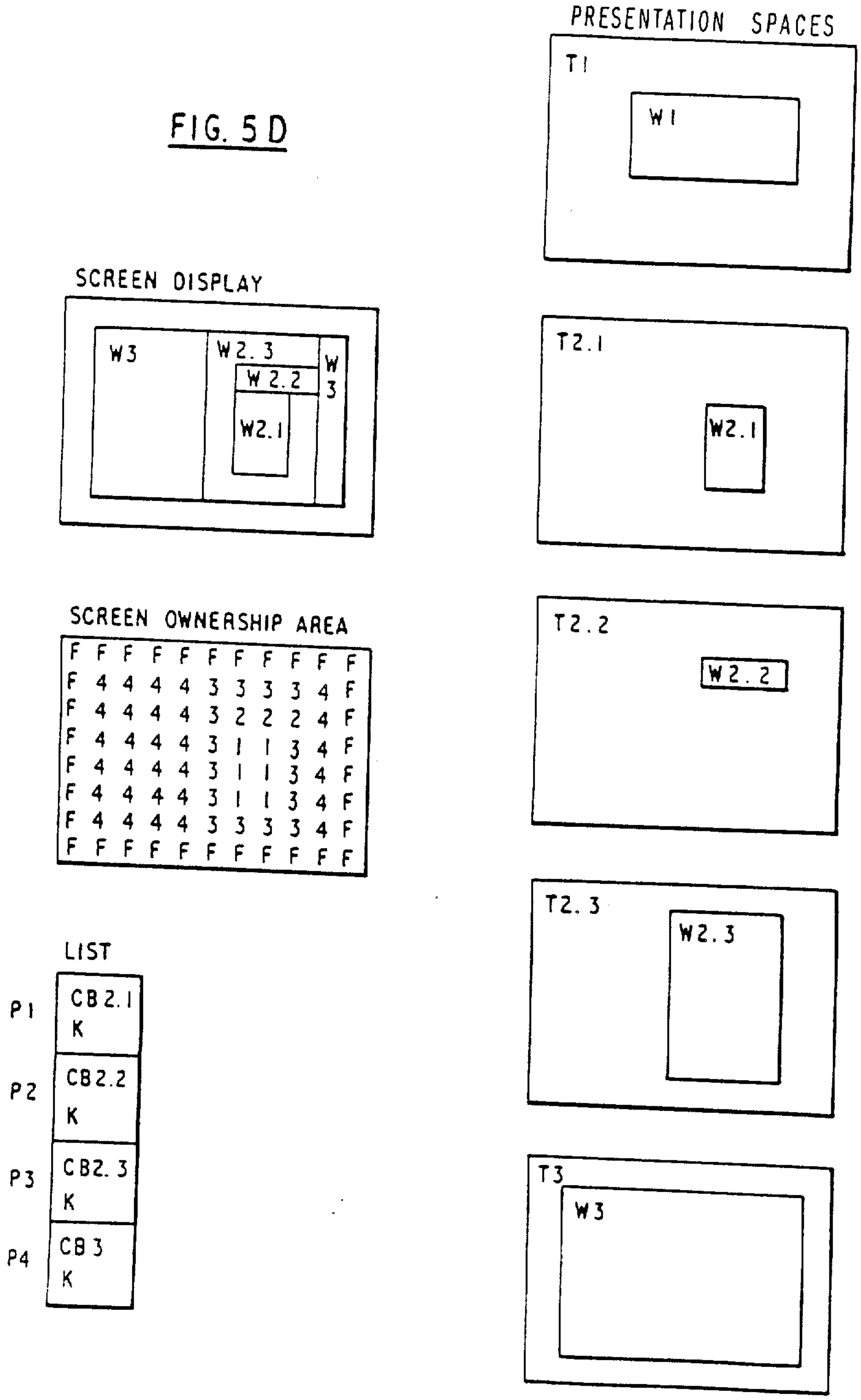
Figure 5E:
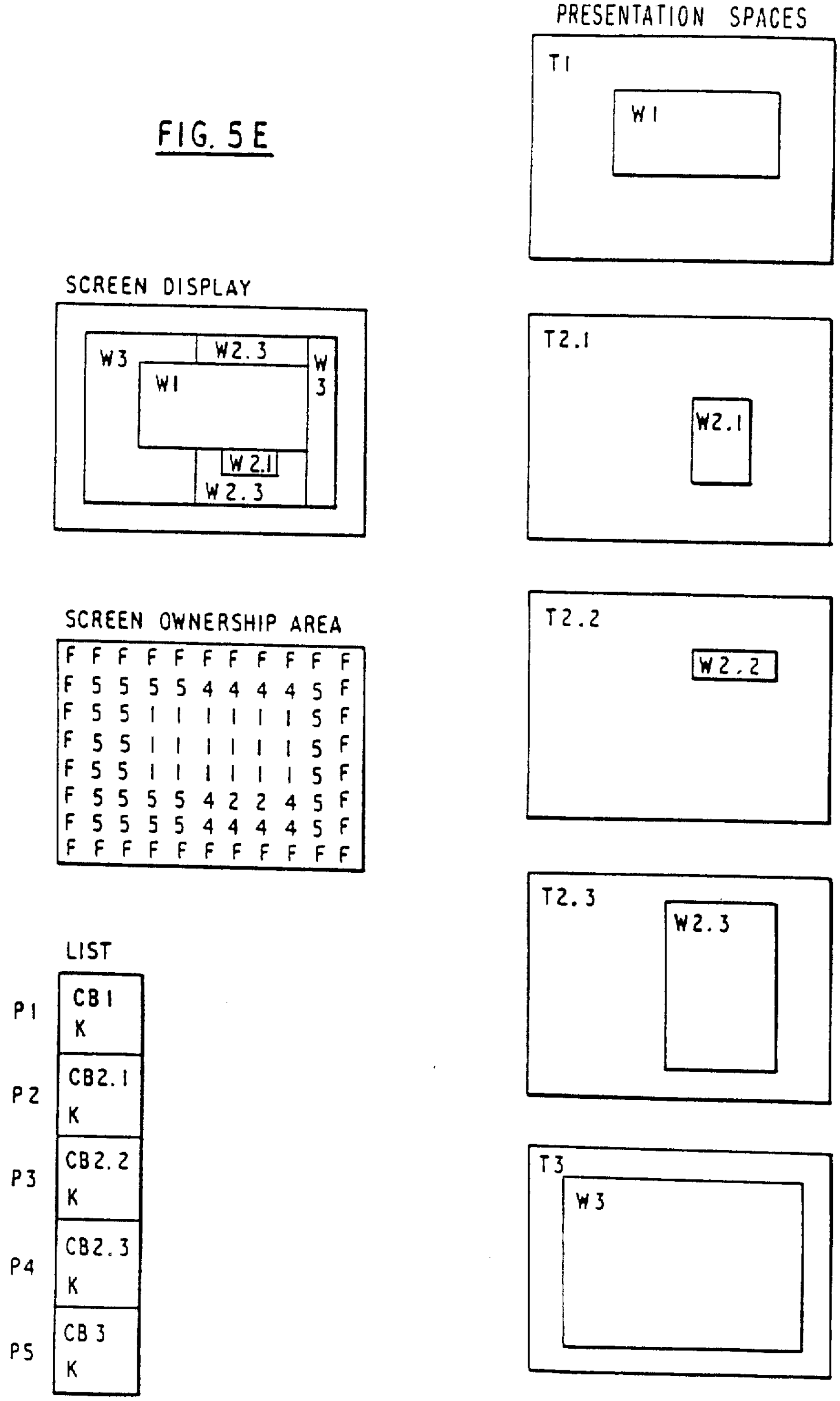
Figure 6:
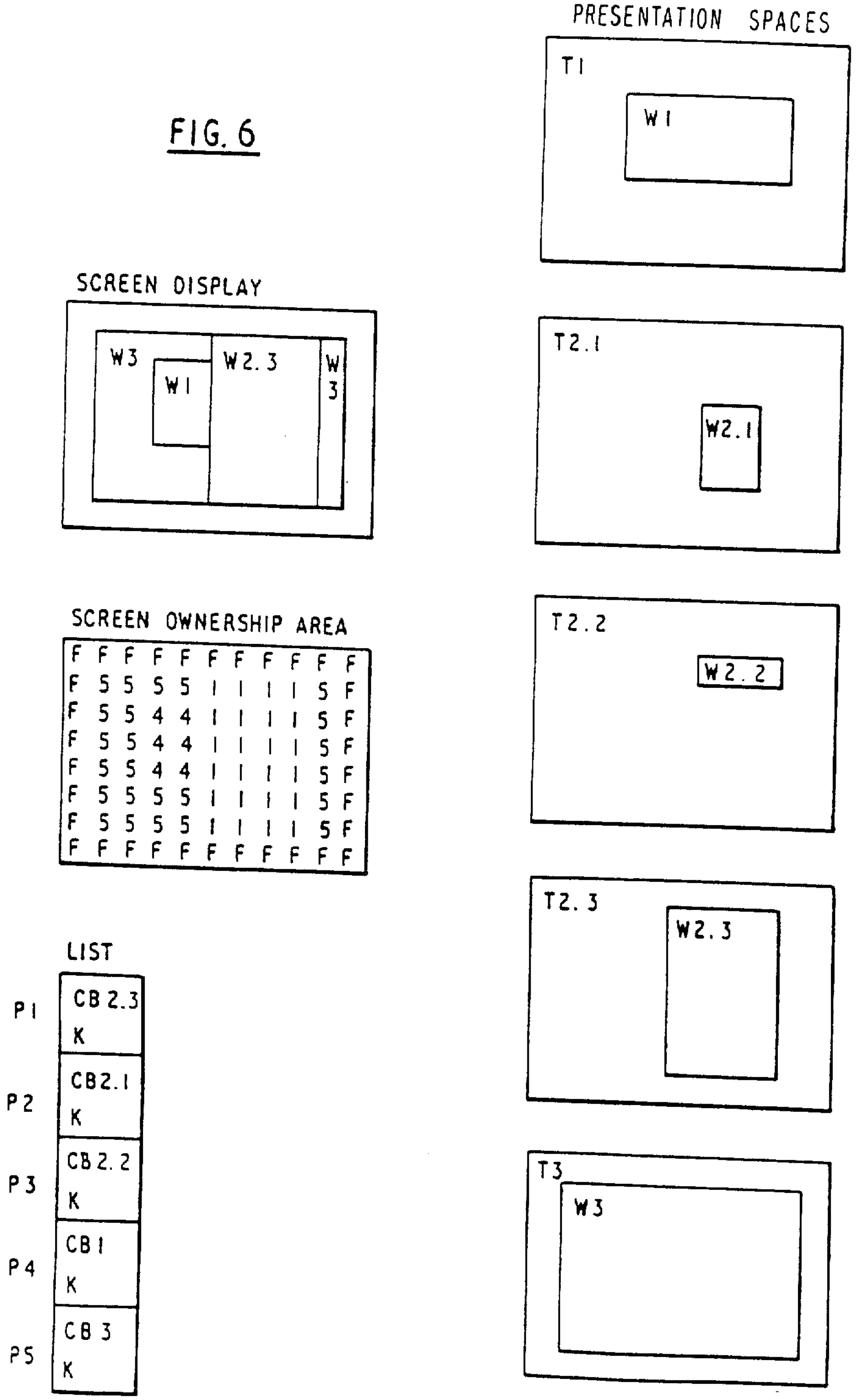
FIG. 6 is a similar illustration of the effect of promoting one, only, of the tasks in the context of the system as it exists as illustrated in FIG. 5 E.

To overcome this, according to the present invention, an ownership priority list is maintained by the system as can be seen in FIGS. 4 to 6. This list is a push down stack from which intermediate items can be removed and replaced. The position of an item in the list PM, where M is 1,2,3, . . . , is one control factor in the handling on the screen ownership area. The individual contents of the list positions is another control factor.

Each list position contains the address CBN of the window control block WCBN corresponding to the window N, defined by task N having that priority, together with an indication of the type TN of window; background, frame or other. Since the window control block defines the size and origin of the window, the actual screen area demanded by that window is available without further investigation. The list position PM is written into the window control block WCBN.

The list position PM is written into each display data area of the screen ownership area for which PM is the most significant list position available.

The arrows in FIG. 4 indicate the relationships involved. Were window N the only active window, M would equal 1 and the window N would be the sole window displayed on the screen and the corresponding data areas of the screen ownership area would each contain P1.

The remaining Figures are stylized to the point of being near cartoons. They are all very similar and only FIG. 5A will be dealt with to any great detail.

FIG. 5A shows the presentation spaces for tasks T1, T2.1, T2.2, T2.3 and T3, each, for convenience shown as screen sized and each having indicated therein, in the appropriate position, a corresponding window W1, W2.1, W2.2, W2.3 and W3. Also indicated are the list, with priority position P1, only, the screen ownership area, symbolically marked with list positions in crude data areas, and the screen display corresponding to the screen ownership area and window configurations shown. All connections between the various parts of the Figure are logical. The list position is large enough to contain a WCB address and an indication K of the type of window to which the list position relates. The screen ownership data area cells, in actuality one per screen data area, although not nearly enough are shown, are each byte sized, permitting M to attain a largest (lowest priority) value corresponding to HEX 'FF', "F" for short.

The assumption for FIG. 5A is that only T3 is active. Thus the list contains only CB3 and the corresponding K in position P1 thereof. The cells of the screen ownership area are all set to F, the highest (lowest priority) value possible. Thereafter, the control block CB3 is accessed to determine the size and position of the window W3 and the cells of the screen ownership area corresponding to that size and window position are each set to "1". No other action is required as no other window is active and the normal mechanisms for generating the display come into play to generate the screen to show only window W3, as defined in storage by T3 and transferred to the screen buffer, not shown in the Figure.

Turning now to FIG. 5B, where it is assumed that T2.3 has been rendered active, it will be seen that the contents of P1 have been pushed down to P2, generated for that purpose, and the entries appropriate to T2.3 have been entered into P1. The cells of the screen ownership area are again all set to "F". The cells appropriate to the highest (lowest priority) occupied position position of the list, P2, are set to "2" and, thereafter, the cells of the screen ownership area corresponding to the next lower (higher priority) value list position are set to "1", overwriting whatever contents were therein. The nature of the cell contents and screen display generated therefrom are indicated.

In turn, FIGS. 5C, 5D and 5E add what is required to show T2.2, T2.1 and T1 being sequentially rendered active. On each iteration, the cells of the screen ownership area are initially set to "F" and the list is traversed in order of ascending priority significance until exhausted.

Now, turning to FIG. 6, it is assumed that T2.3 is again called, without any task having been deleted. T2.3 must move to the top of the list. However, T2.3 exists by virtue of T2, although T2, of itself, only displays in terms of its progeny, T2.1, T2.2 and T2.3. Thus, not only does T2.3 move to the top of the list, but T2.1 and T2.2 are also moved to the top of the list along with T2.3, in order that T2 can display. T2.1 and T2.2 preserve their relative priority order, taking the two immediately lower priority positions immediately under that taken by T2.3. T1 and T3 retain their prior relative positions, but at the bottom of the list. The priority list is now as shown with P1 occupied by CB2.3, P2 occupied by CB2.1, P3 occupied by CB2.2, P4 occupied by CB1 and P5 occupied by CB3, each accompanied by its corresponding type indication K. The screen ownership area is again rebuilt, as before, by setting each cell to "F" and sequentially overwriting each cell, as appropriate, in ascending list position order. The screen display will be generated as shown.

The inclusion of the type indicator K in the list positions enables the address of a single WCB to be used to represent individual features of the presentation space that it is associated with.

The inclusion of the WCB address in each list position means that it is no longer necessary to process the hierarchy to determine the occupant of a display area.

The restriction to the described byte sized cell and the 255 position list length, is in no way limitative. For example, two such cells could be provided for each display area and accessed in parallel.

This arrangement automatically takes care of the complications of the task hierarchy and, in addition, provides added facilities. For example, if the user requires to know if his window impinges on, or is impinged on by, other windows, this can be tested for directly from the screen ownership area contents by testing the cell corresponding to his window for lower or higher priority list position numbers than his own.

The relative priorities of windows can be determined directly from the control block entries of list position if overlapping or underlapping information is not required.

The overwriting of the screen ownership areas is primarily by row, although the entire area can be reset to a given list position value if the corresponding window is screen sized.

Clearly, the relative orders of priority significance can be reversed. The most recently rendered active window could be moved to the lowest necessary position of the list, the cells of the screen ownership area being correspondingly set to "0" rather than to "F".

Having thus described as our invention, what we claim as new, and desire to secure by Letters Patent is:

1. A multiple window display system comprising:

a display device capable of displaying a plurality of display areas, each display area representing data;

at least one presentation buffer for storing data corresponding to at least two windows, each window corresponding to at least one display area, each window having a unique window location in the presentation buffer;

an ordered list memory, said ordered list memory comprising a plurality of locations having sequentially numbered addresses, each address being a window identity code for identifying windows, the order of the window identity codes representing window priorities ranging from lower priority to higher priority;

a screen ownership memory having memory locations, each memory location corresponding to a display area, each memory location containing screen ownership data, the screen ownership data in each memory location comprising a single window identity code; and processor means for (a) first reading the window identity code representing the lower priority window and storing that window identity code in locations of the screen ownership memory corresponding to each display area corresponding to the lower priority window; and then (b) reading the window identity code representing the higher priority window and storing that window identity code in locations of the screen ownership memory corresponding to each display area corresponding to the higher priority window;

characterized in that:

a first location of the ordered list memory contains location data representing the location of a first window in the presentation buffer.

2. A system as claimed in claim 1, characterized in that the processor means reads and stores window identity codes only in response to changes in the ordered list.

3. A system as claimed in claim 2, characterized in that when the processor means stores a new window identity code in a location in the screen ownership memory containing an existing window identity code, the new window identity code overwrites the existing window identity code.

4. A system as claimed in claim 3, characterized in that:

the location addresses of the ordered list memory include a highest priority address and a lowest priority address; and prior to reading the window identity code representing the lower priority window, the processor means stores a fixed value equal to the lowest priority address of the ordered list memory in each location of the screen ownership memory.

5. A system as claimed in claim 4, characterized in that:

each window has a window type; and the first location of the ordered list memory contains type data representing the window type of the first window.

6. A system as claimed in claim 5, characterized in that the first location of the ordered list memory contains display area data representing the display areas corresponding to the first window.

7. A multiple window display system comprising:

a display device capable of displaying a plurality of display areas, each display area representing data;

at least one presentation buffer for storing data corresponding to at least first and second windows, each window corresponding to at least one display area, each window having a size and an origin in the presentation buffer;

an ordered list memory, said ordered list memory having at least a first list memory position and a second list memory position, the first list memory position containing information which specifies (i) the size and origin of the first window in the presentation buffer, and (ii) the display areas corresponding to the first window, the second list memory position containing information which specifies (i) the size and origin of the second window in the presentation buffer, and (ii) the display areas corresponding to the second window, the second window having a lower priority than the first window;

a screen ownership memory having memory locations, each screen ownership memory location corresponding to a display area, each screen ownership memory location containing screen ownership data, the screen ownership data in each screen ownership memory location comprising an identification of a memory position within the ordered list memory; and processor means for (a) first reading the information contained at the second list memory position to obtain the display areas corresponding to the second window, and storing an identification of the second list memory position in locations of the screen ownership memory corresponding to each display area corresponding to the second window; and then (b) reading the information contained at the first list memory position to obtain the display areas corresponding to the first window, and storing an identification of the first list memory position in locations of the screen ownership memory corresponding to each display area corresponding to the first window.

8. A multiple window display system as claimed in claim 7, characterized in that the information which defines the size and origin of each window and the display areas corresponding to each window comprises an address of a window control block which defines the size and origin of a window and the display areas corresponding to the window.

9. A system as claimed in claim 8, characterized in that the processor means reads and stores only in response to changes in the ordered list.

10. A system as claimed in claim 9, characterized in that when the processor means stores an identification of a list memory position in a location in the screen ownership memory containing an existing window identification of a list memory position, the new identification overwrites the existing identification.

11. A system as claimed in claim 10, characterized in that:

the ordered list memory comprises a plurality of locations having sequentially numbered addresses; and the identifications of the list memory positions are the addresses of the ordered list memory.

12. A system as claimed in claim 11, characterized in that:

the location addresses of the ordered list memory include a highest priority address and a lowest priority address; and prior to reading the information contained at the second list memory position, the processor means stores a fixed value equal to the lowest priority address of the ordered list memory in each location of the screen ownership memory.

13. A system as claimed in claim 12, characterized in that:

each window has a window type; and the first position of the ordered list memory contains type data representing the window type of the first window.

* * * * *